Jan. 30, 1934.  W. C. CARTER  1,945,178
HEATING APPARATUS FOR INTERNAL COMBUSTION ENGINES
Filed May 20, 1929
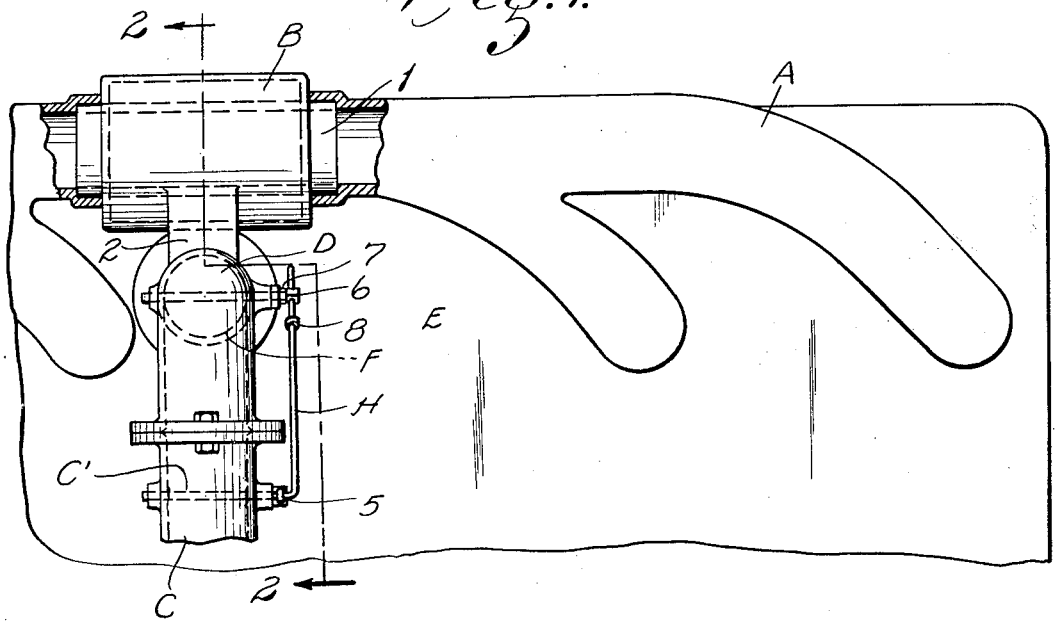
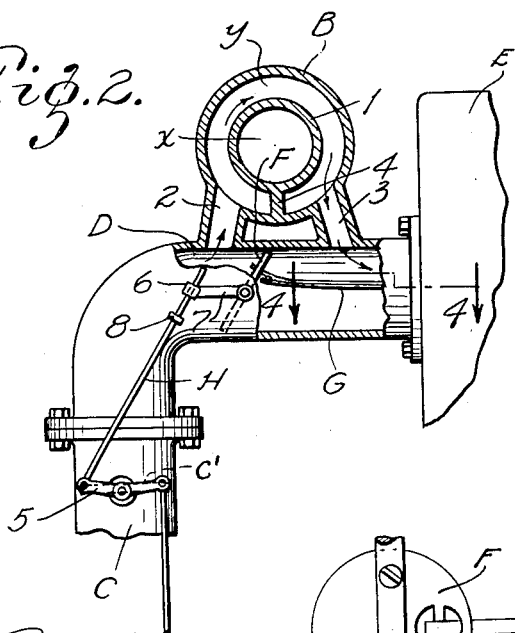
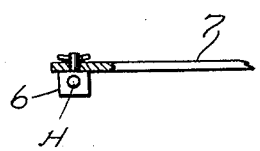
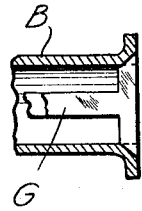
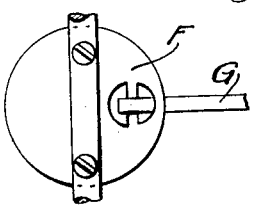
INVENTOR:
WILLIAM C. CARTER
BY Bakewell & Church
ATTORNEYS Patented Jan. 30, 1934

1,945,178

UNITED STATES PATENT OFFICE 1,945,178

HEATING APPARATUS FOR INTERNAL COMBUSTION ENGINES

William C. Carter, Flint, Mich.

Application May 20, 1929. Serial No. 364,541

3 Claims. (Cl. 123—122)

This invention relates to apparatus of the kind that are used on internal combustion engines for heating the combustible mixture supplied by the carburetor to the intake of the engine.

In the apparatus of this general type that are now in commercial use, a "stove" or heating device operated by the exhaust gases of the engine is arranged between the carburetor and the intake of the engine in such a manner that the combustible mixture supplied by the carburetor must always pass through said stove, the temperature of the incoming combustile mixture being regulated by means of a valve that controls the circulation of the escaping exhaust gases through or in contact with said stove. Due to the fact that said valve is arranged in the direct path of travel of the escaping exhaust gases, said valve is apt to give considerable trouble, as the excessive temperature under which the valve is constantly maintained has a tendency to burn the valve, warp it or cause it to stick.

The main object of my invention is to provide a heating apparatus of the general class mentioned, that is more reliable than the conventional or prior apparatus of this general type.

Another object is to provide an apparatus for heating the combustible mixture passing from a carburetor to the intake of an internal combustion engine, which is equipped with a control valve that causes the incoming mixture to absorb heat from a stove or similar device that is maintained at a high temperature, or to pass directly to the intake without first coming in contact with said stove, depending upon the temperature of the engine.

And still another object is to provide a heating apparatus for internal combustion engines of the type in which the exhaust gases from the engine are used to heat a stove or similar device, which is of such design that there is no movable part of the apparatus arranged in the path of the escaping exhaust gases. Other objects and desirable features of my invention will be hereinafter pointed out.

Figure 1 of the drawing is a fragmentary side elevational view, partly broken away, of an internal combustion engine equipped with a heating apparatus constructed in accordance with my invention.

Figure 2 is a vertical sectional view, taken on the line 2—2 of Figure 1, looking in the direction indicated by the arrows.

Figure 3 is a detail view, showing the rockable bearing on the arm of the by-pass valve in the mixture passageway; and Figure 4 is a sectional view, taken on the line 4—4 of Figure 2, looking in the direction indicated by the arrows;

Figure 5 is a detail view, showing how the thermostat is connected to the valve F; and Figure 6 is a top plan view of the valve F and the thermostat G.

In the accompanying drawing which illustrates the preferred form of my invention, A designates the exhaust manifold of an internal combustion engine, B designates a heating device that is maintained at a high temperature, preferably a heating device of the kind commonly referred to as a "stove", which is operated by the exhaust gases escaping from the engine, and C designates the outlet of a carburetor which supplies a combustible mixture to the engine, said outlet being provided with a conventional throttle valve shown in broken lines in Figure 1 in the position it would occupy when wide open, and designated by the reference character C'. The stove B is provided with an exhaust gas passageway $x$ formed by an open-ended tubular member 1, that is adapted to be set in the exhaust manifold A of the engine in such a way that the escaping exhaust gases from one or more cylinders of the engine will always have to flow through the exhaust gas passageway $x$ of the stove, and said stove is also provided with a mixture heating chamber or passageway $y$ that surrounds the exhaust gas passageway $x$ of the stove and which is adapted to be maintained at a high temperature by the heat of the exhaust gases that escape from the engine. The stove B is combined with a mixture passageway D that leads from the outlet C of the carburetor to the intake manifold of the engine, designated by the reference character E in Figure 2, and the heating chamber $y$ of the stove is provided with an inlet 2 and an outlet 3, both of which communicate with the mixture passageway D. As shown in Figure 2, the heating chamber $y$ of the stove is provided with a partition 4 arranged so that the mixture which enters said chamber through the inlet 2 will have to circulate through said chamber in the direction indicated by the arrows, and then escape from said chamber through the outlet 3. In order that the mixture coming from the carburetor may be either circulated through the heating chamber $y$ of the stove before said mixture enters the intake of the engine, or may be admitted directly to the intake without first circulating through the stove, a control valve F is arranged inside of the mixture passageway D at a point intermediate the inlet 2 and the outlet 3 of the heating chamber y of the stove. When said valve F is in its closed positioin, shown in Figure 2, the mixture from the carburetor circulates through the stove and then enters the intake of the engine, thus becoming highly heated by extraction or absorption of heat from the stove, and when said valve F is in its open position, the mixture from the carburetor will pass directly into the intake E of the engine, or, in other words, will by-pass the stove.

Various means may be used to govern or control the position of the valve F, but said valve is preferably combined with a manually-operable controlling means and with an automatically operating controlling means, designed so that one can act or be operated independently of the other and without affecting the operation of the other. In the form of my invention herein illustrated a temperature governed controlling device G is provided for automatically moving the valve F towards or into its open position, and an independent means, designated by the reference character H, is provided for shifting the valve F into its open position when the throttle valve C' of the carburetor is moved into its wide open position, assuming, of course, that the valve F is closed at the time the throttle valve is moved into its wide open position. The temperatures governed controlling device G is herein shown diametrically and may consist of any suitable type of thermostat connected to the valve F and arranged within the heated area produced by the engine, in such a manner that after said thermostat has become heated to a certain approximate temperature, it will move the valve F into its open position, and when it cools off, or drops to a certain approximate temperature, the valve F will move back to its closed position, shown in Figure 2. In view of the fact that there are now on the market various kinds of thermostats that can be used for imparting the above described movement to the valve F, I wish it to be understood that my invention is not limited to the use of any particular type or kind of thermostat. The thermostat G that is herein illustrated is composed of a plurality of strips of metal that have different co-efficients of expansion and which are combined in the conventional manner. The member G is provided at one end with a slot co-acting with a pin carried by the valve F. When the thermostat G is expanded the top half of same will expand more than the lower half, thus causing a downward thrust on the valve F which opens said valve, and when the temperature of the engine drops to a lower predetermined degree, the thermostat will contract more on the upper half and cause an upward movement which will move the valve F towards its closed position, thus, in effect, automatically selecting the proper mixture for the engine. The means H that is used to shift the valve F into its open position when the throttle valve of the carburetor is moved into its wide open position, consists of a rod pivotally connected at one end to an arm 5 on the shaft of the throttle valve C', and having its opposite end passing loosely through an oscillating or rockable guide 6, carried by an arm 7 that is attached to the shaft of the valve F, the rod H being long enough so that the valve C' can stay closed and the valve F can be wide open without liability of the rod H coming out of its guide 6. When the throttle valve C' is moved into its wide open position, by rocking the arm 5 in clockwise direction, a stop 8 on the rod H comes in contact with the bearing 6 on the arm 7 and exerts a thrust on said arm in a direction to move the valve F into its open position. A slight movement or partial movement of the throttle valve C' towards its open position, however, has no affect on the valve F, due to the fact that the stop 8 on the rod H is spaced away a considerable distance from the bearing 6 on the arm 7 when the throttle valve is in its closed position, and notwithstanding the fact that the throttle valve is operatively connected with the valve F, said valve F is free to move under the influence of its co-acting temperature governed controlling device G, independently of and relatively to the throttle valve, due to the fact that the rod H is free to slide in a bearing 6 that is rockably or oscillatingly mounted on the arms 7 of the valve F. Likewise, the throttle valve is capable of moving independently of and relatively to the valve F.

With a heating apparatus of the construction above described the mixture supplied by the carburetor with a partly open throttle valve, will circulate through the heating chamber y of the stove and then enter the intake of the engine when the engine is first set in operation, and will continue to flow in this path so long as the throttle valve of the carburetor is maintained in other than its wide open position, or so long as the temperature of the engine remains at or below a certain approximate temperature. In the event the throttle valve of the carburetor is moved into its wide open position, the valve F will open, thus causing the mixture from the carburetor to by-pass the stove, or, in other words, pass directly from the carburetor into the intake of the engine. Likewise, if the thermostat G in the mixture passageway D attains a certain approximate temperature, when the throttle valve is in a closed or partly closed position, said thermostat will cause the valve F to open and permit the mixture to flow from the carburetor into the intake manifold E of the engine without first circulating through the stove. When the engine is cold or below a certain approximate temperature, the valve F will remain in its closed position, as shown in Figure 2, assuming, of course, that the throttle valve C' is not in its wide open position. Shifting the throttle valve C' into its wide open position causes the valve F to open and permit the mixture to pass directly from the carburetor to the intake of the engine. Also when the engine attains a certain approximate degree the thermostat G will move the valve F into its open position, shown in Figure 5, even though the throttle valve C' is in a partly closed position or any position other than its wide open position.

The apparatus can be constructed in various ways without departing from the spirit of my invention. I prefer, however, to construct the stove B in the form of a casting that is integrally connected with an elbow-shaped tubular member that constitutes the mixture passageway D of the apparatus and which can be used to attach the carburetor to the intake manifold E of the engine, as such a structure is inexpensive to make, and it is easy to install.

From the foregoing it will be seen that in my improved heating apparatus there is no valve or similar movable part that is arranged in the path of travel of the exhaust gases escaping from the engine. On the contrary, the regulation or control of the apparatus is effected by changing the position of a valve F that is never subjected to a high temperature, and which, accordingly, will not burn out, warp or stick.

Having thus described my invention, what I claim as new and desire to secure by Letters Patent is:

1. An apparatus for heating the mixture being supplied to an internal combustion engine, comprising a heating device that is maintained at a high temperature, a control valve that is adapted to be set in one position so as to cause the mixture from the carburetor to absorb heat from said device and then enter the intake of the engine and set in a different position so as to cause the mixture to pass directly to said intake, means for opening said control valve when the throttle valve of the carburetor is moved into its wide open position, and a temperature governed means for said control valve arranged to move the same independently of and relatively to the throttle valve.

2. An apparatus for heating the mixture being supplied to an internal combustion engine, comprising a mixture passageway leading from the carburetor of the engine to the intake of the engine, a mixture heating chamber, means for utilizing the exhaust gases escaping from the engine to maintain said chamber at a high temperature, an inlet and an outlet for said chamber communicating with said mixture passageway, a control valve in said mixture passageway arranged intermediate the points where said inlet and outlet communicate with said passageway, a means operated by the throttle valve of the carburetor of the engine for changing the position of said control valve, and a temperature governed means arranged to automatically change the position of said control valve under certain conditions.

3. A mixture heating apparatus for an internal combustion engine, comprising a mixture passageway, a throttling means in said passageway, a manually-operated governing means for said throttling means for selecting the mixture at wide open throttle, and an automatic control for said throttling means, governed by heat, for selecting the mixture at all times other than wide open throttle.

WILLIAM C. CARTER.